Nov. 17, 1959    M. A. SIMMONS    2,912,952
AIRCRAFT CARRIER CONSTRUCTION FOR HYDRO-SKI SEAPLANES
Filed April 8, 1955
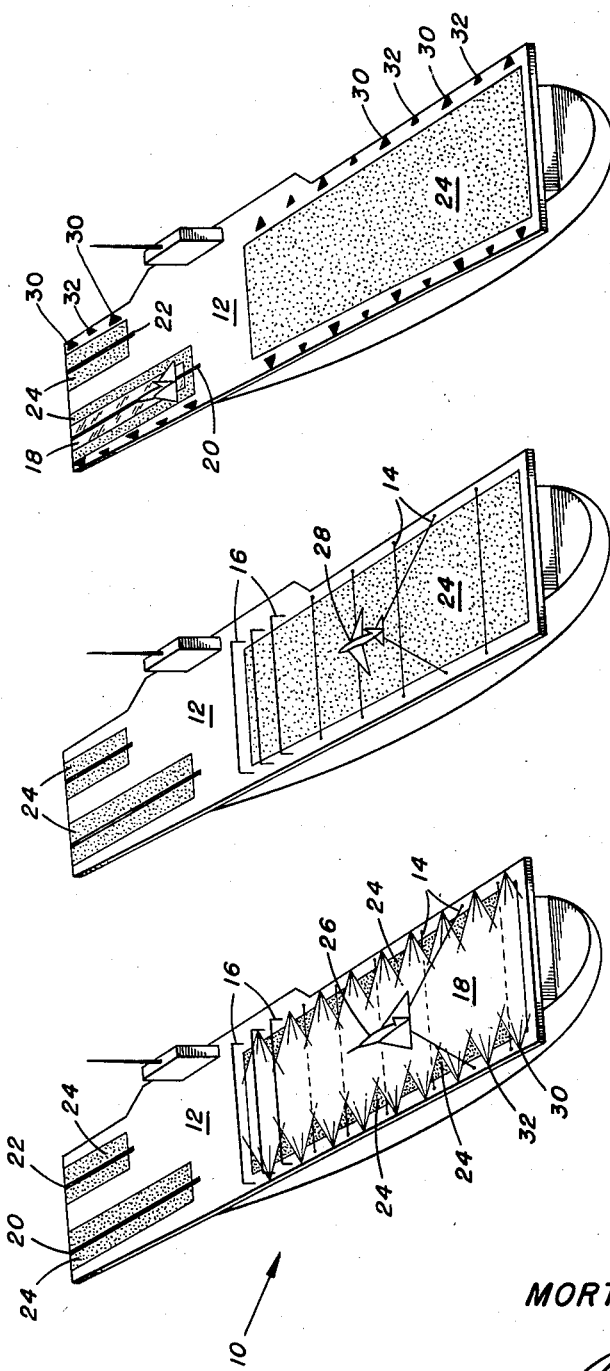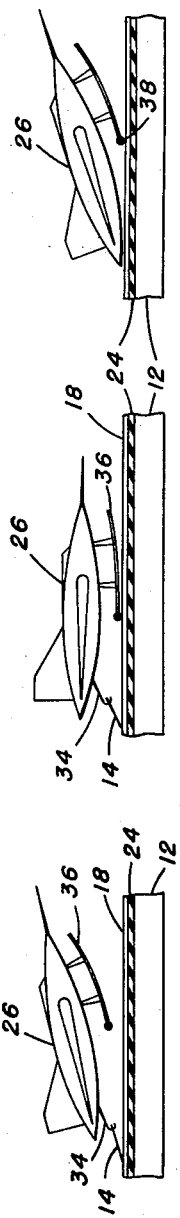
INVENTOR
MORTON ALGER SIMMONS
BY
ATTORNEYS United States Patent Office 2,912,952
Patented Nov. 17, 1959

2,912,952

AIRCRAFT CARRIER CONSTRUCTION FOR HYDRO-SKI SEAPLANES

Morton A. Simmons, Montgomery County, Md.

Application April 8, 1955, Serial No. 500,317

3 Claims. (Cl. 114—43.5)

(Granted under Title 35, U.S. Code (1952), sec. 266)

The invention described herein may be manufactured and used by or for the Government of the United States of America for governmental purposes without the payment of any royalties thereon or therefor.

The present invention relates to an aircraft carrier construction for hydro-ski seaplanes and more particularly to an aircraft carrier construction for hydro-ski seaplanes which permits the carrier to be readily used by both wheel equipped and hydro-ski equipped planes.

The advent of the hydro-ski airplane has indicated that many aircraft will be able to perform their missions without the necessity of constructing large and expensive airports, the surface of a body of water being useable as a landing surface. The hydro-ski construction is lighter and has less drag than pontons. However, it is also desirable that the hydro-ski airplane be able to land on aircraft carriers, thus giving them greater flexibility, increasing their range, etc. It is further to be desired that construction of new aircraft carriers or extensive modifications to existing carriers be avoided, and that the carriers not be so modified that their normal use by wheeled planes is prevented.

It is an object of the present invention to accomplish the above desiderata with readily available and inexpensive equipment.

It is a further object of the present invention to provide an aircraft carrier construction which will permit a carrier to receive selectively and alternately within brief intervals either wheel or hydro-ski equipped airplanes.

Other objects and many of the attendant advantages of this invention will be readily appreciated as the same becomes better understood by reference to the following detailed description when considered in connection with the accompanying drawings wherein:

Fig. 1 is a perspective view of an aircraft carrier in accordance with the present invention, with a hydro-ski airplane landing thereon;

Fig. 2 is a perspective view of the aircraft carrier of Fig 1 with a wheeled airplane landing thereon;

Fig. 3 is a perspective view of the aircraft carrier of Fig. 1 with a hydro-ski airplane about to be catapulted therefrom;

Fig. 4 is a side view of a hydro-ski airplane landing on the aircraft carrier of Fig. 1 and engaging an arresting wire;

Fig. 5 is a view similar to Fig. 4, the airplane sliding along the deck of the aircraft carrier; and Fig. 6 is a view similar to Fig. 5, the hydro-ski aircraft taxiing on the carrier deck.

Referring now to the drawings, wherein like reference characters designate like or corresponding parts throughout the several views, there is shown in Fig. 1 an aircraft carrier 10 having a landing deck 12 thereon. Associated with the deck 12 are the usual arresting wires 14 and barriers 16. All of the landing portion of the deck is coated with a film of water 18. At the forward end of deck 12 are two catapult stations 20, 22. The deck 12 is covered at its landing portion and at catapult stations 20, 22 with sheets 24 of rubber or rubber-like material, such as Koroseal. The sheets 24 will be waterproof, have a high coefficient of friction when dry and a low coefficient of friction when wet.

Shown landing on the sheeted and flooded deck 12 is a hydro-ski equipped airplane 26, the hook thereof (not shown) having caught an arresting wire 14.

In Fig. 2, the deck 12 is substantially covered with the sheet 24, and a wheeled airplane 28 landing thereon in the usual fashion. The deck 12 is substantially clear of water.

A hydro-ski airplane is shown in Fig. 3 at catapult station 20, which has a part of sheet 24 thereon, and which is coated with a film of water 18. In contrast, catapult station 22 is substantially clear of water. Also diagrammatically illustrated in Fig. 3 are the nozzles used to flood the deck 12, there being preferably provided large nozzles 30 alternating with smaller nozzles 32. It will be understood that sea water may be supplied to the nozzles 30 and 32 by means of a conventional pump and pipes, not shown, and that scuppers may be provided to carry off excess water. Any suitable means may be used to place water on the deck, the nozzles 30 and 32 merely being the most convenient.

Fig. 4 shows the hydro-ski airplane 26 landing on the deck 12, its arresting hook 34 engaging an arresting wire 14 and its hydro-skis 36 in the air. The deck 12 is shown covered by the sheet 24, which is coated with a film of water 18. Fig. 5 shows the hydro-ski plane 26 with its hydro-skis 36 flat and sliding along on the film of water 18 and the sheet 24. In Fig. 6, the plane 26 is shown taxiing along the deck 12, a wheel 38 at the rear edge of each hydro-ski 36 supporting the plane and rolling or sliding along the deck.

In order to receive a hydro-ski airplane, the nozzles 30, 32 are caused to flood the deck 12 and sheet 24 with a film of water 18. When the hydro-skis of the plane touch down, the water serves as a lubricant between the metal of the hydro-ski and the rubber or rubber-like sheet 24. This is a well known phenomenon, exemplified by the slipping of automobile tires on street-railway tracks which are wet from rain. Hence, it is not necessary that the water be deep, but only that there be sufficient water to insure against dry spots. The hydro-ski plane may then taxi on the small wheels 38 of the hydro-skis 36 to one of the catapult stations 20, 22. The sheet 24 of the station is coated with water, and the plane may then be catapulted from the deck, the water again serving as a lubricant.

Where it is desired to receive wheeled planes, the water is cut off, and normal operations conducted, the planes landing on sheet 24. Although it is preferable that the sheet 24 not have water thereon when wheeled planes are landing, the presence of water will interfere little, if at all, with such operations, since the halting of the plane is accomplished by the arresting wires. Hence, normal operations with wheeled planes can be accomplished without loss of time.

Of course, it will be appreciated that with suitable nozzles and pumps, the coating of the deck 12 and sheet 24 with a film of water can be accomplished in an extremely short time.

Obviously many modifications and variations of the present invention are possible in the light of the above teachings. It is therefore to be understood that within the scope of the appended claims the invention may be practiced otherwise than as specifically described.

What is claimed is:

1. In an aircraft carrier a landing deck, said landing deck comprising a supporting base, a rubber sheet covering said base, arresting means to decelerate landing aircraft and nozzle spray means to deposit a film of water over said rubber sheet whereby conventional hydro-ski airplanes may slide over said rubber sheet while being decelerated by said arresting means to accomplish landing operations on said carrier.

2. In an aircraft carrier a landing deck, said landing deck comprising a supporting base, a rubber sheet covering said base, arresting means to decelerate landing craft and nozzle means positioned along at least one side of said deck whereby by spraying water therefrom to deposit a film of water over said sheet, said landing deck can be converted from landing operations for conventional carrier aircraft to landing operations for conventional hydro-ski airplanes and by ceasing said spraying of water said landing deck can be reconverted to landing operations for conventional carrier aircraft.

3. In an aircraft carrier a catapult station, said catapult station comprising a supporting base, a rubber sheet covering said base and nozzle means positioned along at least one side of said station whereby by spraying water therefrom to deposit a film of water over said sheet said catapult station can be converted from catapult operations for conventional carrier aircraft to catapult operations for conventional hydro-ski airplanes and by ceasing said spraying of water said catapult station can be reconverted to catapult operations for conventional carrier aircraft.

References Cited in the file of this patent

UNITED STATES PATENTS

| | | |
|---|---|---|
| 1,356,974 | Smith | Oct. 26, 1920 |
| 2,174,716 | Bethell | Oct. 3, 1939 |
| 2,433,238 | Ramirez | Dec. 23, 1947 |
| 2,466,150 | Burt | Apr. 5, 1949 |
| 2,523,314 | Maxon et al. | Sept. 26, 1950 |
| 2,526,541 | Colley | Oct. 17, 1950 |

FOREIGN PATENTS

| | | |
|---|---|---|
| 505,316 | Great Britain | May 9, 1939 |

OTHER REFERENCES

Scientific American, October 2, 1920, page 339.
Aviation News, June 20, 1949, page 15.